United States Patent [19]
Yang

[11] Patent Number: 5,519,276
[45] Date of Patent: May 21, 1996

[54] DC COMPOUND MOTOR HAVING AN AUXILIARY GENERATOR WHICH SUPPLIES POWER FOR SHUNT FIELD WINDING EXCITATION

[76] Inventor: Tai-Her Yang, 5-1 Taipin St. Si-Hu Town, Dzan-Hwa, Taiwan

[21] Appl. No.: 357,349

[22] Filed: Dec. 15, 1994

Related U.S. Application Data

[63] Continuation of Ser. No. 87,422, Jul. 8, 1993, abandoned.

[51] Int. Cl.[6] .................................................. H02K 17/44
[52] U.S. Cl. .......................... 310/113; 310/177; 310/184; 318/140; 322/39
[58] Field of Search ................................. 310/113, 207, 310/177, 165, 112, 168, 158, 171, 184, 198; 318/140, 146; 322/16, 39, 87

[56] References Cited

U.S. PATENT DOCUMENTS

| | | | |
|---|---|---|---|
| 1,318,946 | 10/1919 | Wynne | 310/113 UX |
| 3,445,746 | 5/1969 | McManus | 322/39 UX |
| 3,560,822 | 2/1971 | Loshbough | 318/146 |
| 4,019,104 | 4/1977 | Parker | 310/113 |
| 4,138,629 | 2/1979 | Miller | 318/140 |
| 4,442,385 | 4/1984 | Van Sickle | 318/140 |
| 4,482,830 | 11/1984 | Iwaki | 310/113 |
| 4,514,652 | 4/1985 | Olson | 310/113 |

FOREIGN PATENT DOCUMENTS

| | | | |
|---|---|---|---|
| 0436140 | 10/1926 | Germany | 310/113 |

OTHER PUBLICATIONS

McGrow-Hill Encyclopedia Of Science & Technology, (No Month) 1977, pp. 328–330.

*Primary Examiner*—R. Skudy
*Attorney, Agent, or Firm*—Bacon & Thomas

[57] ABSTRACT

A DC compound motor of the type having a series winding and a shunt field winding includes an auxiliary generator driven by the motor for supplying power to the shunt field winding. The generator can be chosen, or a control circuit added, to control the current supply to the shunt field winding based on the speed of the motor.

6 Claims, 1 Drawing Sheet

5,519,276

DC COMPOUND MOTOR HAVING AN AUXILIARY GENERATOR WHICH SUPPLIES POWER FOR SHUNT FIELD WINDING EXCITATION

This application is a continuation of application Ser. No. 08/087,422, filed Jul. 8, 1993 now abandoned.

SUMMARY OF THE INVENTION

The present invention relates to a DC compound motor and an auxiliary generator driven by the motor for supplying power to the shunt field winding of the motor. More specifically, the invention relates to a DC compound motor which includes an armature rotor having a series field winding and a shunt field winding and which, by virtue of a mechanical coupling, drives an auxiliary generator which in turn supplies power to excite the shunt field winding of the DC compound motor without the necessity for an additional DC power supply (although one can be included if desired). The auxiliary generator can be arranged to adjust, set the value of, or increase the shunt field excitation current in response to the speed of the motor. The polarity of the shunt field winding relative to the series winding can be set in either assisted compound or differential compound mode, and the related wiring connections may include the types known to those skilled in the art as long compound and short compound wiring. In addition, the generator may also provide electric energy for other loads simultaneously by means of an auxiliary battery or by means of the auxiliary generator.

DETAILED DESCRIPTION OF THE INVENTION

When it is desired to employ the filed excitation current of a conventional shunt or compound DC motor as a speed control, a shunt field exciting power supply is usually required to match the power-driven winding made up of the series field winding and armature. The additional shunt field exciting power supply is readily used in applications where AC power supplied by a utility can be converted for use as the DC power supply, but it is not convenient where portable power sources such as batteries must be used, because the shunt field excitation requires an additional independent battery, which is not only costly but also makes synchronous power storage difficult.

Figure 3:
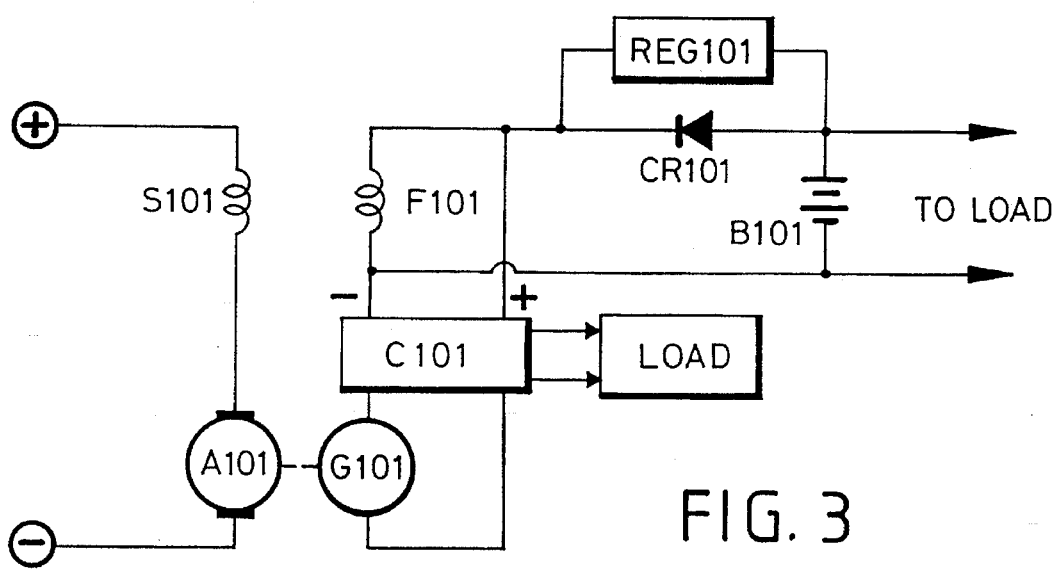
FIG. 3 is a diagram showing a DC compound motor according to a third preferred embodiment having an assisted type auxiliary battery circuit.

The DC compound motor of the preferred embodiment solves these problems by using an auxiliary generator driven by the motor as the power supply for excitation of the shunt field winding. The armature rotor A101 of the DC compound motor is driven by interaction between the series field winding and the shunt field winding to drive, by means of a mechanical coupling, an auxiliary generator G101 which in turn supplies power for exciting the shunt field winding of the motor, without the necessity of providing an additional DC power supply for field winding excitation (although one may be included for startup or low speed operation as shown in FIG. 3 and described below).

Figure 1:
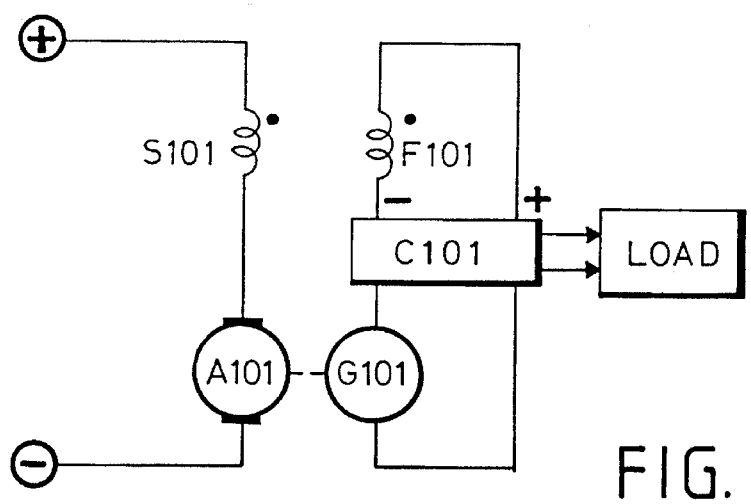
FIG. 1 is a diagram showing an assisted compound type circuit for a DC motor according to a first preferred embodiment of the present invention.
Figure 2:
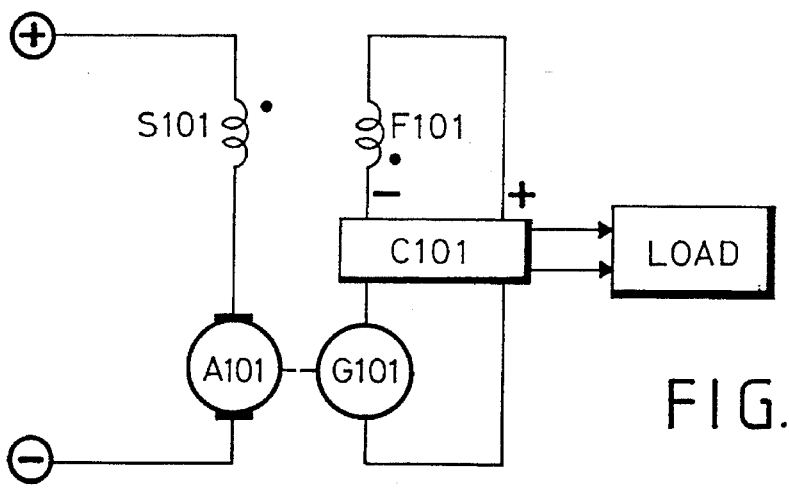
FIG. 2 is a diagram shown a differential compound type circuit for a DC motor according to a second preferred embodiment of the present invention.

As shown in FIGS. 1 and 2, the preferred DC motor includes armature rotor A101 which may be either of the internal rotation or external rotation type, and which includes a commutator, an armature winding, and a shaft (not shown). The shaft provides a rotary mechanical output to drive the auxiliary exciting generator G 101 by means of a mechanical coupling in order to excite the shunt field winding of the main motor.

The field windings of the DC generator include a series field winding S101 which is connected in series with the motor brush and the armature A101, and a shunt field winding F101 connected to be excited by the auxiliary generator. Those skilled in the art will appreciate that related mechanical structures (not shown) such as the end casing, bearing, machine base, iron core, supplier, etc., will also be utilized in the DC motor, but these structures are conventional.

Auxiliary generator G101 can be either an AC or DC generator which is mechanically coupled with the armature rotor of the DC main motor and connected to the shunt field winding F101 through a control device C101 which provides commutation to control the excitation current in the shunt field winding in response to the speed of the motor. The polarity of the shunt field winding relative to the series winding may be in assisted compound (parallel) form, as shown in FIG. 1, or differential compound (anti-parallel) form, as shown in FIG. 2, and the wiring connections may be in what is known as long compound or short compound form.

The preferred DC compound motor and auxiliary generator for supplying power to the shunt field winding may provide the following different functions for the DC motor depending on the type of auxiliary generator and means of control:

(1) An auxiliary generator can be provided which changes to a constant current output when a pre-defined speed is exceeded. For example, a saturated series type generator or a differential compound generator has this property. Alternatively, instead of coming from the generator itself, the constant current may be obtained through appropriate control by the control device C101.

(2) The characteristics of the generator referred to in part (1) may be further controlled, adjusted, or set to obtain a predetermined value for the constant shunt field current.

(3) The excitation current produced by the auxiliary generator, which is positively increased in response to the speed, may also be supplied to the series winding to produce assisted compound or differential compound excitation.

(4) The characteristics of the generator used for function (3) can be further controlled, for adjusting the amount of excitation current to the series winding.

The present design of a DC motor and an auxiliary generator driven by the motor for supplying power to the shunt field winding has the advantage that the driving power supply can be in the form of a variable voltage DC power supply or compound DC power supply. As a result, the compound motor can have the operating characteristics of various types of motors without the necessity of adding independent exciting power supplies. Furthermore, as noted above, when the motor is powered by a portable power source, such as a storage battery, the need for an additional shunt field excitation battery can be omitted to reduce the weight and cost.

In addition, for practical application, although the main motor can be started by means of a series field winding with an armature, as shown in FIG. 3, an auxiliary excitation battery B101 can be added to provide additional power to the shunt field F101 during starting or lower speed operation, and a choke diode CR101 can be connected in series between auxiliary battery B101 and shunt field winding F101 and in parallel with a voltage regulator REG101 to limit charging current from flowing back to auxiliary battery B101 from auxiliary generator G101 except through the voltage regulator REG101.

In summary, a DC compound motor drives an auxiliary generator to supply power supply for the shunt field excitation to thereby eliminate the need for an additional field exciting battery, resulting in lower cost and weight, and improved control of synchronous power consumption between the armature and the shunt field.

I claim:

1. In apparatus comprising a DC compound motor having a series winding connected to an armature and also a shunt field winding, an excitation current for the shunt field winding serving as a speed control for the DC compound motor; and an auxiliary generator mechanically coupled to the DC compound motor so as to be driven by the DC compound motor upon rotation of the armature in response to excitation of the shunt field winding by said excitation current, the improvement wherein:

the auxiliary generator is connected to the shunt field winding of the DC compounded motor and the excitation current for the shunt field winding of the DC compound motor is supplied to the shunt field winding of the DC compound motor by said auxiliary generator.

2. Apparatus as claimed in claim 1, further comprising a battery connected to said shunt field winding for supplying, during start-up and low speed operation, excitation current to said shunt field winding in addition to the excitation current supplied by the generator.

3. Apparatus as claimed in claim 1, further comprising a control circuit for commutating the current supplied by the generator to said shunt field winding.

4. Apparatus as claimed in claim 1, wherein an output of said auxiliary generator is a constant current output when a predetermined speed of the generator is exceeded.

5. Apparatus as claimed in claim 4, wherein said current limiting means is formed by the generator itself, the generator having the characteristic of supplying a constant current when a rotor of the generator is rotated at above a predetermined speed.

6. Apparatus as claimed in claim 1, wherein said current limiting means is a control circuit connected between an output of the generator and the shunt field winding.

* * * * *